(12) United States Patent
Iijima et al.

(10) Patent No.: US 7,899,312 B2
(45) Date of Patent: Mar. 1, 2011

(54) LENS BARREL AND IMAGING DEVICE

(75) Inventors: Shuji Iijima, Yokohama (JP); Takao Ozaki, Tokyo (JP)

(73) Assignee: Nikon Corporation, Tokyo (JP)

( * ) Notice: Subject to any disclaimer, the term of this patent is extended or adjusted under 35 U.S.C. 154(b) by 512 days.

(21) Appl. No.: 11/730,327

(22) Filed: Mar. 30, 2007

(65) Prior Publication Data

US 2007/0237507 A1 Oct. 11, 2007

(30) Foreign Application Priority Data

Apr. 5, 2006 (JP) .............................. 2006-104388

(51) Int. Cl.
*G03B 17/00* (2006.01)
(52) U.S. Cl. ....................................................... 396/55
(58) Field of Classification Search ................. 359/554; 348/208.11, 208.5, 208.7; 396/350, 55, 133, 396/348, 349
See application file for complete search history.

(56) References Cited

U.S. PATENT DOCUMENTS

| | | | |
|---|---|---|---|
| 5,559,571 A * | 9/1996 | Miyamoto et al. | ............. 396/52 |
| 5,758,207 A * | 5/1998 | Endoh | .......................... 396/85 |
| 5,930,042 A | 7/1999 | Miyamoto et al. | |
| 7,477,308 B2 | 1/2009 | Omiya et al. | |
| 7,817,203 B2 | 1/2009 | Omiya et al. | |

| | | | |
|---|---|---|---|
| 2006/0093339 A1 * | 5/2006 | Umezu | ........................ 396/55 |

FOREIGN PATENT DOCUMENTS

| | | |
|---|---|---|
| JP | 10-170974 | 6/1998 |
| JP | 2000193875 A * | 7/2000 |
| JP | 2002-236248 | 8/2002 |
| JP | 2004-318051 | 11/2004 |

OTHER PUBLICATIONS

Machine translation JP 2000-193875, Ichise, "Lens Barrel and Optical Instruments having the lens barrel", Jul. 14, 2000.*
Extended European Search Report issued in corresponding European Patent Application No. 07290404.8, on Jul. 13, 2007.
Office Action for corresponding Korean Application No. 10-2007-0030807; mailed Nov. 5, 2010.

* cited by examiner

*Primary Examiner*—Rodney E Fuller
*Assistant Examiner*—Linda B Smith

(57) ABSTRACT

There is provided a lens barrel with an vibration reduction unit, which allows a reduction in dimension of the lens barrel in the optical-axis direction in the accommodated state, and an imaging device including such lens barrel. The lens barrel includes first and second lens units, a drive part for driving one of the first and second lens units in the optical-axis direction with respect to a stationary part, the drive part driving the one of the first and second lens units to approach each other during shifting to an accommodated state, and an vibration reduction part for moving the other lens unit in a plane substantially orthogonal to the optical axis so that at least part of a position of the other lens unit in the optical-axis direction coincides with a position of the drive part in the accommodated state.

11 Claims, 5 Drawing Sheets

LENS BARREL AND IMAGING DEVICE

The disclosure of the following priority application is herein incorporated by reference: Japanese Patent Application No. 2006-104388, filed on Apr. 5, 2006.

BACKGROUND OF THE INVENTION

1. Field of the Invention

The present invention relates to a lens barrel with a vibration reduction unit and an imaging device.

2. Description of Related Art

A lens barrel is known that includes a vibration reduction unit in which part of a lens unit constituting a shooting optical system is moved in a plane orthogonal to the optical axis during shooting, thereby reducing an influence of a camera shake (for example, refer to Japanese Unexamined Patent Application Publication No. 2002-236248).

A lens barrel is also known that includes such a vibration reduction unit and is of a retractable type in which the lens barrel is accommodated in a camera body during non-shooting.

With the retractable lens barrel, there is a demand to shorten the dimension of the lens barrel in the optical-axis direction during accommodation so as to achieve a reduction in the overall thickness of the camera during accommodation.

With conventional lens barrels, a reduction in the overall thickness of the lens barrel has been achieved by reducing the thickness of a lens unit. However, the lens unit has a thickness reduction limitation in order to maintain its function.

SUMMARY OF THE INVENTION

It is an object of the present invention to provide a lens barrel with a vibration reduction unit that allows a reduction in dimension of the lens barrel in the optical-axis direction in the accommodated state, and an imaging device including such a lens barrel.

The present invention achieves the abovementioned objective by way of the following solution:

According to a first aspect of the present invention, there is provided a lens barrel including: a stationary part; a first lens unit arranged movably in a direction of an optical axis with respect to the stationary part; a second lens unit arranged with respect to the first lens unit along the direction of the optical axis; a drive part that drives the first lens unit in the direction of the optical axis with respect to the stationary part, the drive part moving with the first lens unit toward the second lens unit while the lens barrel is shifting to a retracted position; and a vibration reduction part that moves the second lens unit in a plane substantially orthogonal to the optical axis, wherein the vibration reduction part is configured to partially overlap with the drive part in the direction of the optical axis when the lens barrel is at the retracted position.

In the lens barrel according to the first aspect of the present invention, the lens barrel may further comprise: a lens unit shifting part that moves the first lens unit and the second lens unit relatively in the direction of the optical axis so as to shift the first lens unit and the second lens unit to the retracted position.

In the lens barrel according to the first aspect of the present invention, the drive part may include a motor having an output shaft, wherein an axial direction of the output shaft is substantially orthogonal to the optical axis.

In the lens barrel according to the first aspect of the present invention, the lens barrel may further comprise: a gear part that connects a torque about the output shaft provided by the motor to a torque about an axis substantially parallel with the optical axis.

In the lens barrel according to the first aspect of the present invention, the vibration reduction part may be configured to have an accommodation part where the drive part is stored when the lens barrel is at the retracted position.

In the lens barrel according to the first aspect of the present invention, the accommodation part may comprise a space having one of a cavity and a recess formed in the vibration reduction part.

In the lens barrel according to the first aspect of the present invention, the lens barrel may further comprise: a shutter unit having a shutter-unit drive part, wherein at least a part of the shutter-unit drive part is configured to overlap with the drive part in the direction of the optical axis when the lens barrel is at the retracted position.

In the lens barrel according to the first aspect of the present invention, the shutter-unit drive part may be arranged so as not to occupy an area through which the drive part passes in a plane substantially orthogonal to the direction of the optical axis while the lens barrel is being switched from a shooting position to the retracted position.

In the lens barrel according to the first aspect of the present invention, the vibration reduction part may comprise a vibration reduction drive part for driving the second lens unit and a position detection part for detecting a position of the second lens unit with respect to the stationary part, wherein at least a part of the vibration reduction drive part and a part of the position detection part are configured to overlap in the direction of the optical axis with at least one of the drive part and the shutter-unit drive part when the lens barrel is at the retracted position.

In the lens barrel according to the first aspect of the present invention, the first lens unit may be arranged on a side of an object in the direction of the optical axis in an optical system comprising the first lens unit and the second lens unit, wherein the first lens unit performs focusing by movement in the direction of the optical axis.

According to a second aspect of the present invention, there is provided an imaging device comprising any one of above described lens barrel.

According to a third aspect of the present invention, there is provided a lens barrel comprising: a stationary part; a lens unit arranged movably in a direction of an optical axis with respect to the stationary part; and a drive part arranged on the lens unit, the drive part driving the lens unit in the direction of the optical axis with respect to the stationary part, wherein an axial direction of an output shaft of the drive part is substantially orthogonal to the optical axis.

In the lens barrel according to the third aspect of the present invention, the lens unit may be arranged on a side of an object in the direction of the optical axis, wherein the lens unit performs focusing by movement in the direction of the optical axis.

According to a fourth aspect of the present invention, there is provided an imaging device comprising any one of above third aspect of lens barrel.

In the lens barrel according to the fourth aspect of the present invention, the lens unit may be arranged on a side of an object in the direction of the optical axis, wherein the lens unit performs focusing by movement in the direction of the optical axis.

As described above, according to the present invention, at least part of the position of the vibration reduction part in the optical-axis direction coincides with the position of the drive part, thus allowing a reduction in dimension in the optical-axis direction.

DETAILED DESCRIPTION OF THE INVENTION

Figure 1:
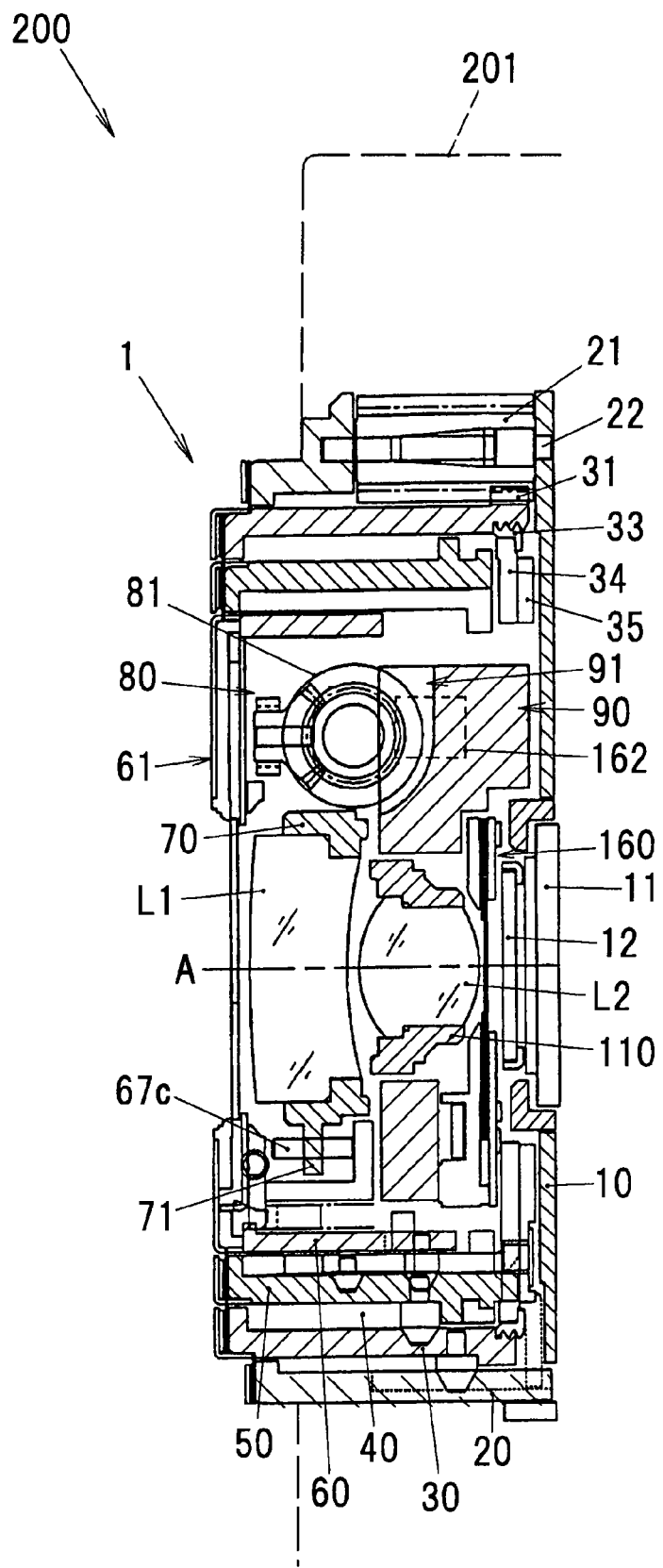
FIG. 1 is a sectional view showing an embodiment of a lens barrel in a section including an optical axis, the view showing an accommodated state of the lens barrel.
Figure 2:
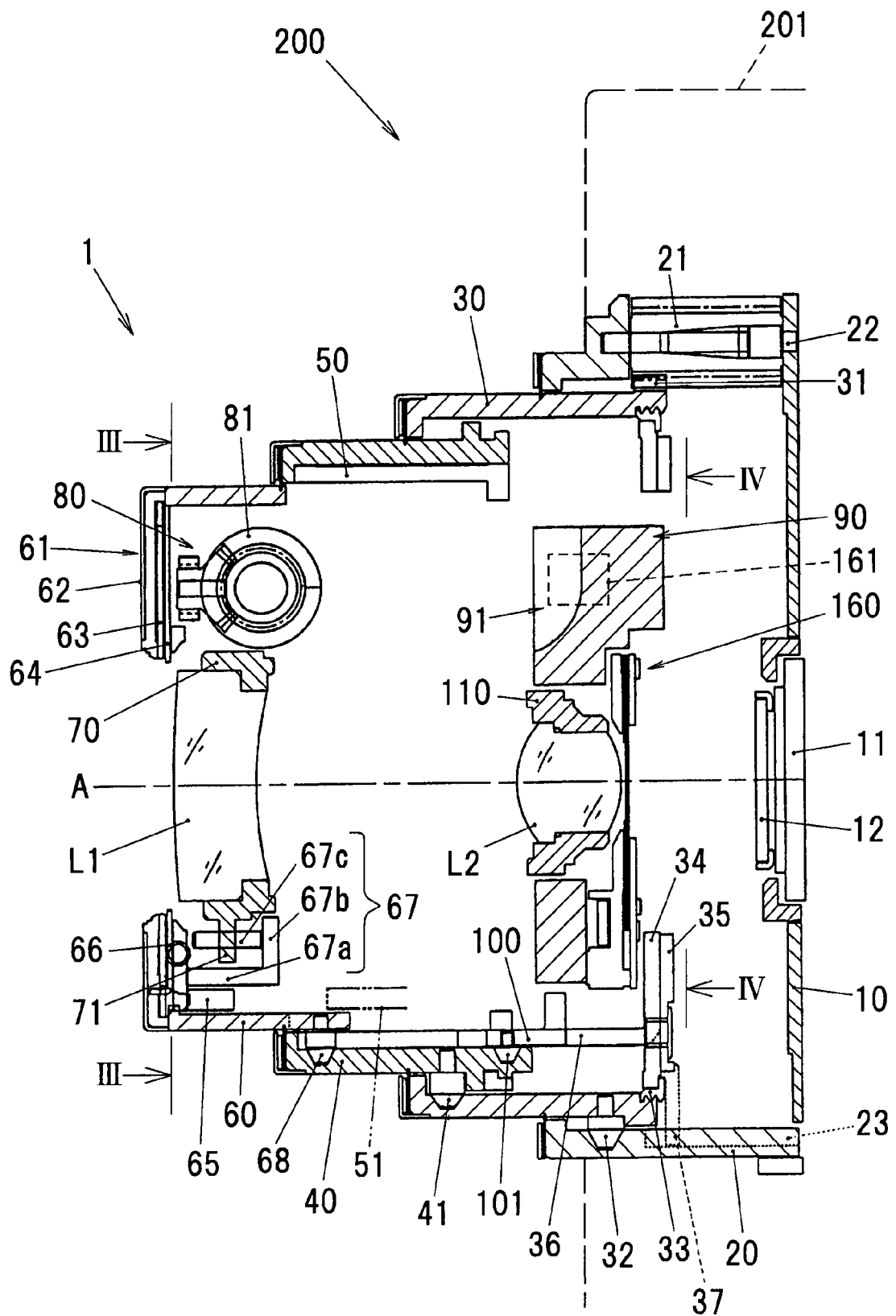
FIG. 2 is a sectional view showing the lens barrel in a shooting state.

Referring to the drawings, a description is made thereafter about a preferred embodiment of a lens barrel to which the present invention is applied and an imaging device including such lens barrel.

The imaging device is a digital still camera 200 of non-exchangeable lens type (referred to hereinafter simply as "camera 200"), and includes a retractable lens barrel 1 that is partly accommodated in a camera body 201 when in a non-shooting state.

The lens barrel 1 includes a first lens unit L1, a second lens unit L2, a lens-barrel base part 10, a stationary barrel 20, an intermediate barrel 30, a cam barrel 40, a linear-drive guide barrel 50, a linear-drive barrel 60, a first-lens unit chamber 70, a focus-lens drive part 80, and a vibration reduction (VR) unit 90.

The first lens unit L1 and the second lens unit L2 are arranged in order from the object side or subject side along the direction of an optical axis A. The first lens unit L1 and the second lens unit L2 function together to constitute a zoom lens of two-unit construction. The first lens unit L1 also serves as a focus lens.

In the normal shooting position of the camera 200, the optical axis A of the first lens unit L1 and second lens unit L2 is located below the rotation axis of the intermediate barrel 30 and cam barrel 40, as described later. It is noted that, in the specification of the application, the wording "normal shooting position of the camera 200" designates a position of the camera 200 when shooting an oblong picture with the optical axis A set horizontally.

The lens-barrel base part 10 is a plate-like member fixed to the camera body 201.

The lens-barrel base part 10 comprises a charge-coupled device (CCD) 11 and an optical low-pass filter (LPF) 12. The CCD 11 is a solid-state image sensor for converting a subject image imaged by the first lens unit L1 and second lens unit L2 into an electric signal. The CCD 11 is arranged on the projection side of the second lens unit L2, and is fixed to the center portion of the lens-barrel base part 10 at the position that coincides with the optical axis A.

The LPF 12 serves to prevent the occurrence of moiré on an image that the CCD 11 obtains. The LPF 12 is arranged between the second lens unit L2 and an imaging surface of the CCD 11, and is fixed to the lens-barrel base part 10 like the CCD 11.

The stationary barrel 20 is a barrel located on the outermost periphery among the barrels constituting the lens barrel 1, and serves as a stationary part fixed to the lens-barrel base part 10.

The stationary barrel 20 has a drive gear 21 arranged on the inner periphery of the stationary barrel 20 and on the outer periphery of the intermediate barrel 30, as described later. The drive gear 21 is connected to an output shaft 22 of a motor, not shown, fixed to the lens-barrel base part 10. The output shaft 22 is arranged through a hole formed in the lens-barrel base part 10 to protrude inwardly of the stationary barrel 20. The direction of a rotation axis of the output shaft 22 is substantially parallel to the optical axis A.

The stationary barrel 20 has a linear-drive guide groove 23 formed in the inner-peripheral surface and extending in the direction of the optical axis A. A protrusion 37 of a stopper ring 35, as described later, is fitted into the linear-drive guide groove 23.

The intermediate barrel 30 is a barrel located on the inner periphery of the stationary barrel 20. The intermediate barrel 30 has a tooth part 31 arranged on the outer-peripheral surface on the image side in the optical-axis direction and meshed with the drive gear 21. The intermediate barrel 30 also has a cam follower 32 arranged on the outer-peripheral surface. The cam follower 32 is fitted into a cam groove formed in the inner-peripheral surface of the stationary barrel 20.

A fixing ring 33 is fixed by a threaded coupling to the intermediate barrel 30 at an end of the inner-peripheral surface on the image side in the optical-axis direction. The fixing ring 33 is formed annularly, and on the inner periphery thereof a linear-drive guide part 34 and the stopper ring 35 are arranged.

The linear-drive guide part 34 is formed annularly, and has an outer-peripheral edge slidably engaged with the inner periphery of the fixing ring 33. The linear-drive guide part 34 includes a linear-drive key 36 protruding from the surface opposite the object side in the optical-axis direction to the object side in the optical-axis direction. When the linear-drive guide barrel 50 and a second-lens unit barrel 100, as described later, are driven in the direction of the optical axis A, the linear-drive key 36 guides the linear-drive guide barrel 50 and the second-lens unit barrel 100 in the direction of the optical axis A by restricting their rotation about the optical axis A.

The stopper ring 35 is formed annularly. The stopper ring 35 is arranged closer to the image side in the optical-axis direction than the linear-drive guide part 34, and is fixed to the linear-drive guide part 34 by a screw. The stopper ring 35 has a protrusion 37 protruding from the outer periphery of the intermediate barrel 30. The protrusion 37 has a distal end fitted into the linear-drive guide groove 23 formed in the stationary barrel 20.

The cam barrel 40 is a barrel located on the inner periphery of the intermediate barrel 30. The cam barrel 40 has a cam follower 41 arranged on the outer-peripheral surface on the image side in the optical-axis direction. The cam follower 41 is fitted into a cam groove formed in the inner-peripheral surface of the intermediate barrel 30.

The cam barrel 40 has two cam grooves, not shown, formed in the inner-peripheral surface. Cam followers 68 of the linear-drive barrel 60, as described later, are fitted into one of the cam grooves, and cam followers 101 of the second-lens unit barrel 100, as described later, are fitted into another cam groove.

The linear-drive guide barrel 50 is a barrel located on the inner periphery of the cam barrel 40. The linear-drive guide barrel 50 serves to guide the linear-drive barrel 60, as described later, in the direction of the optical axis A.

The linear-drive barrel 60 is a barrel located on the inner periphery of the linear-drive guide barrel 50 and arranged, among the barrels constituting the lens barrel 1, closest to the object side in the shooting state of the camera 200.

The linear-drive barrel 60 has a known lens barrier unit 61 arranged at the end on the object side or subject side in the optical-axis direction.

The lens barrier unit 61 serves to protect an incident surface of the first lens unit L1 in the accommodated state of the lens barrel 1, and includes a front decoration 62, a barrier blade 63, a blade retainer 64, a drive ring 65, and a spring 66.

The barrier blade 63 is arranged shiftably between the open state and the closed state in synchronism with the driving of the drive ring 65, and is biased in the open-state direction by the spring 66 in the shooting state. When the lens barrel 1 is shifted to the retracted state, the lens barrier unit 61 is pressed and driven by a pressing part 51 integrally formed with the linear-drive guide barrel 50. With this, the barrier blade 63 is driven to the closed state against a biasing force of the spring 66. On the other hand, when the lens barrel 1 is shifted from the retracted state to the shooting state, pressure on the drive ring 65 produced by the pressing part 51 of the linear-drive guide barrel 50 is released. With this, the barrier blade 63 is shifted to the open state by the spring 66.

The linear-drive barrel 60 includes a first-lens unit chamber guide part 67. The first-lens unit chamber guide part 67 serves to guide linearly in the direction of the optical axis A a first-lens unit chamber 70 inserted on the inner periphery of the linear-drive barrel 60, as described later.

The first-lens unit chamber guide part 67 includes a connection 67a, a support 67b, and a guide pin 67c.

The connection 67a is formed to protrude from the surface of the lens barrier unit 61 opposite the image side in the optical-axis direction to the image side in the optical-axis direction. The support 67b is a plate-like portion connected to a distal end of the connection 67a. The guide pin 67c is a cylindrical portion protruding from the surface of the support 67b directed to the object side in the optical-axis direction to the object side in the optical-axis direction.

The linear-drive barrel 60 has cam followers 68 arranged on the outer-peripheral surface on the image side in the optical-axis direction. The cam followers 68 are fitted into a cam groove formed in the inner-peripheral surface of the cam barrel 40 as described above.

The first-lens unit chamber 70 is an annular member located on the inner periphery of the linear-drive barrel 60, and at the inner-peripheral end thereof the first lens unit L1 is fixed. The first-lens unit chamber 70 includes a guide part 71, a guide hole 72, and a threaded part 73.

The guide part 71 is a plate-like portion protruding radially outwardly from the outer-peripheral surface of the first-lens unit chamber 70.

Figure 3:
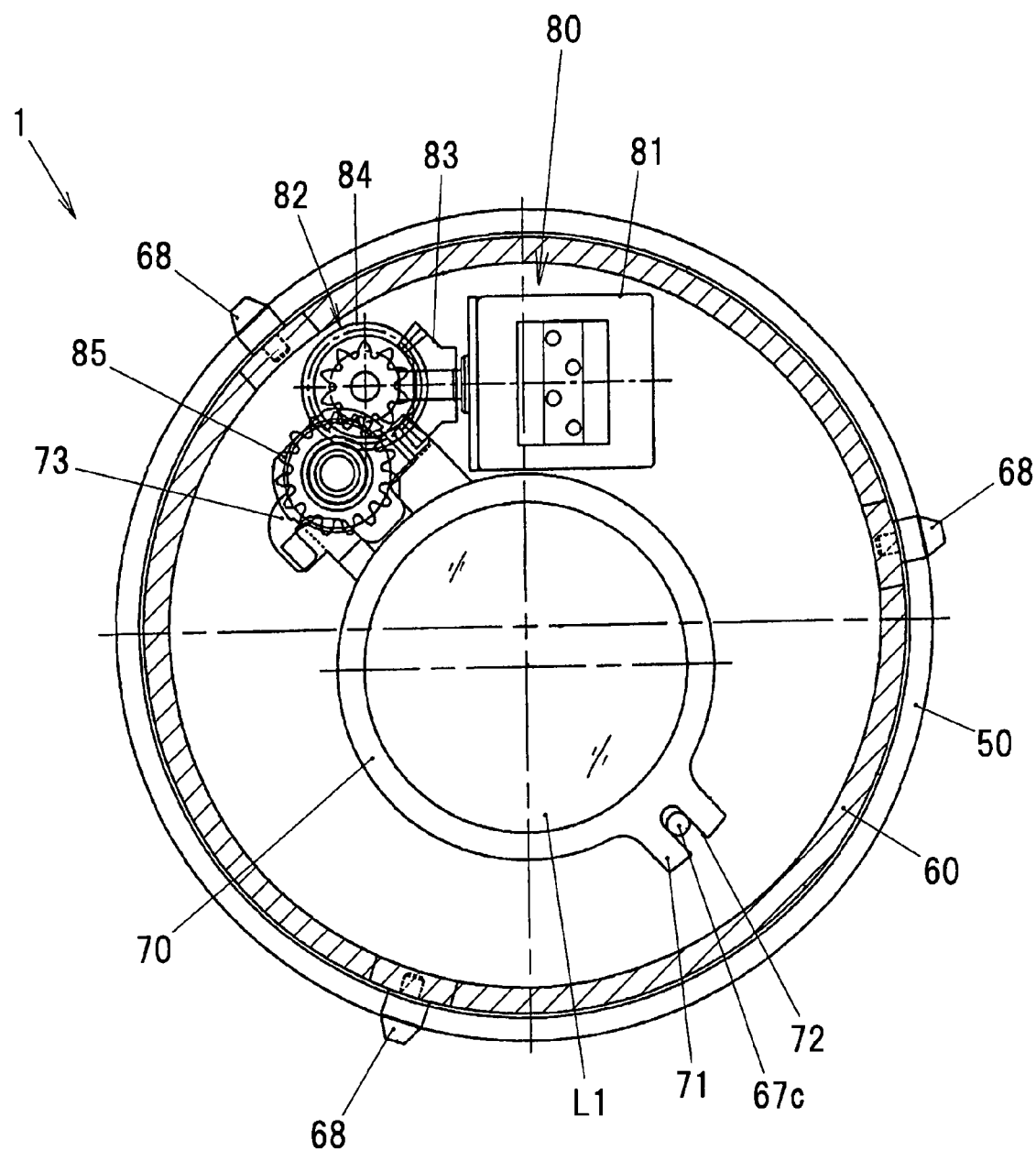
FIG. 3 is a cross sectional view taken along the line indicated with arrows III-III in FIG. 2.

The guide hole 72 is a slot formed in the guide part 71 in the middle thereof along the circumferential direction of the first-lens unit chamber 70 and extending in the radial direction of the first-lens unit chamber 70. The guide hole 72 has an end that opens to the outer periphery of the first-lens unit chamber 70, and the guide pin 67c provided to the linear-drive barrel 60 is arranged therethrough as shown in FIG. 3.

The threaded part 73 is formed on the outer-peripheral surface of the first-lens unit chamber 70 to be radially opposite the guide part 71 and protrude from the outer periphery of the first-lens unit chamber 70. The threaded part 73 includes a internal thread, not shown, threaded to a screw provided to a second focus gear 85 of the focus-lens actuator 80, as described later.

The focus-lens drive part 80 includes a focus motor 81 and a gear 82.

The focus motor 81 is a stepping motor supported with respect to the linear-drive barrel 60 by a support, not shown. The focus motor 81 is arranged above the first lens unit L1 in the normal shooting position of the camera 200. It is noted that, in the specification of the application, the wording "above the first lens unit L1" designates that the position in the direction of the optical axis A coincides with the position of the first lens unit L1.

In this embodiment, the focus motor 81 is located adjacent to the first lens unit L1, and is arranged thereabove in the normal shooting position of the camera 200. The focus motor 81 rotates in response to focusing instructions from a control part, not shown, provided to the camera 200 so as to drive the first-lens unit chamber 70 in the direction of the optical axis A.

The axial direction of an output shaft of the focus motor 81 is orthogonal to the optical axis A, and is substantially parallel to the horizontal plane in the normal shooting position of the camera 200.

The gear 82 includes a bevel gear 83, a first focus gear 84, and a second focus gear 85.

The bevel gear 83 is press-fitted into a distal end of the output shaft of the focus motor 81.

The first focus gear 84 is arranged adjacent to the bevel gear 83, and has a rotation axis substantially parallel to the optical axis A. The first focus gear 84 includes a bevel-gear part meshed with a bevel gear 83 and a spur-gear part, and serves to change the rotation-axis direction of a torque outputted from the focus motor 81 by substantially 90 degrees.

The second focus gear 85 is a spur gear meshed with the spur-gear part of the first focus gear 84. A screw, not shown, is press-fitted into the second focus gear 85 to rotate in synchronism with rotation of the second focus gear 85. The screw is threaded to the threaded part 73 formed with the first-lens unit chamber 70. The screw is a feed screw for driving through rotation thereof the first-lens unit chamber 70 in the direction of the optical axis A.

The VR unit 90 is a known vibration reduction unit for ensuring vibration reduction of a subject image by shifting, in response to output of a sensor, not shown, provided to the camera 200, the second lens unit L2 in the directions corresponding to pitching and yawing of the lens barrel 1 in the plane orthogonal to the optical axis A.

Figure 5:
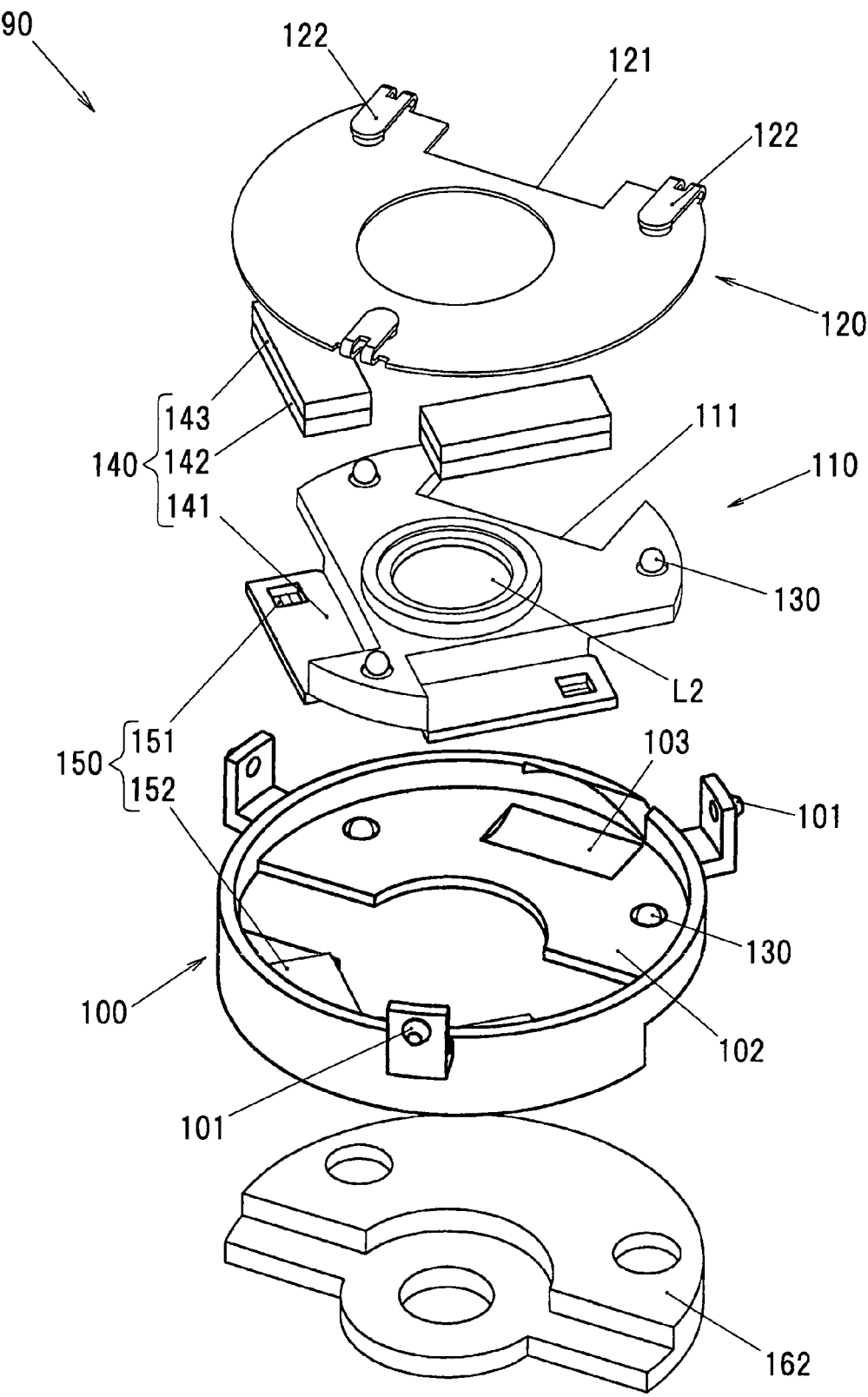
FIG. 5 is an exploded perspective view showing a configuration of a VR unit.

Referring to FIGS. 1 and 5, the VR unit 90 includes a second-lens unit barrel 100, a second-lens unit chamber 110, a cover 120, steel balls 130, a pair of vibration reduction actuators or drive parts 140, a pair of position detectors 150, and a shutter unit 160.

The second-lens unit barrel 100 is a barrel located on the inner periphery of the cam barrel 40. The second-lens unit barrel 100 includes cam followers 101, a second-lens unit chamber support 102, and a concavity 103.

The cam followers 101 are formed on the outer-peripheral surface of the second-lens unit barrel 100 and, for example, are three in number equiangularly separated by 120 degrees in the circumferential direction of the second-lens unit barrel 100. The cam followers 101 are fitted into the cam groove formed in the inner-peripheral surface of the cam barrel 40.

The second-lens unit chamber support 102 is a plate-like portion arranged on the inner periphery of the second-lens unit barrel 100. The second-lens unit chamber support 102 has an opening formed in the center so as not to intercept an optical path of image light incident on the first lens unit L1 and the second lens unit L2.

The concave portion 103 is obtained by denting the surface of the second-lens unit chamber support 102 opposite the object side in the optical-axis direction in a rectangular manner as viewed from the direction of the optical axis A.

The second-lens unit chamber 110 is shaped like a plate having an opening formed in the center, at the edge of which the second lens unit L2 is fixed. The second-lens unit chamber 110 is arranged on the object side in the optical-axis direction with respect to the second-lens unit chamber support 102 of the second-lens unit barrel 100.

The second-lens unit chamber 110 has a recessed portion 111 formed by rectangularly cutting a portion coinciding with the concave portion 103 of the second-lens unit chamber support 102 as viewed from the direction of the optical axis A.

The cover 120 is a substantially disk-like member provided to the second-lens unit chamber 110 on the object side in the optical-axis direction, and is fixed to the second-lens unit barrel 100. The cover 120 has an opening formed in the center so as not to interfere with an optical path of image light incident on the first lens unit L1 and the second lens unit L2.

In a similar manner to the second-lens unit chamber 110, the cover 120 has a recessed portion 121 formed by rectangularly cutting a portion coinciding with the concaved portion 103 of the second-lens unit chamber support 102 as viewed from the direction of the optical axis A.

The steel balls 130 are arranged between the second-lens unit chamber support 102 and the second-lens unit chamber 110 and between the second-lens unit chamber 110 and the cover 120, respectively. The steel balls 130 are arranged about the optical axis A to be equiangularly separated by 120 degrees and, for example, are six in total number. Referring to FIG. 5, one of the three steel balls 130 provided to the second-lens unit chamber support 102 is not shown. The steel balls 130 serve to movably support the second-lens unit chamber 110 in the plane substantially orthogonal to the optical axis A.

The cover 120 includes a plurality of, for example, three pressure springs 122 in the position coinciding with the steel balls 130 as viewed from the direction of the optical axis A. The pressure springs 122 serve to press the steel balls 130 to the second-lens unit barrel 100 to limit rattling of the second-lens unit chamber 110.

A space including the concaved portion 103 of the second-lens unit barrel 100, the recessed portion 111 of the second-lens unit chamber 110, and the recessed portion 121 of the cover 120 is set to coincide with part of the focus motor 81 in the position in the direction of the optical axis A when the lens barrel 1 is in the accommodated state as shown in FIG. 1. This space arranged in the VR unit 90 is referred to hereinafter as a focus-motor accommodation part 91.

Figure 4:
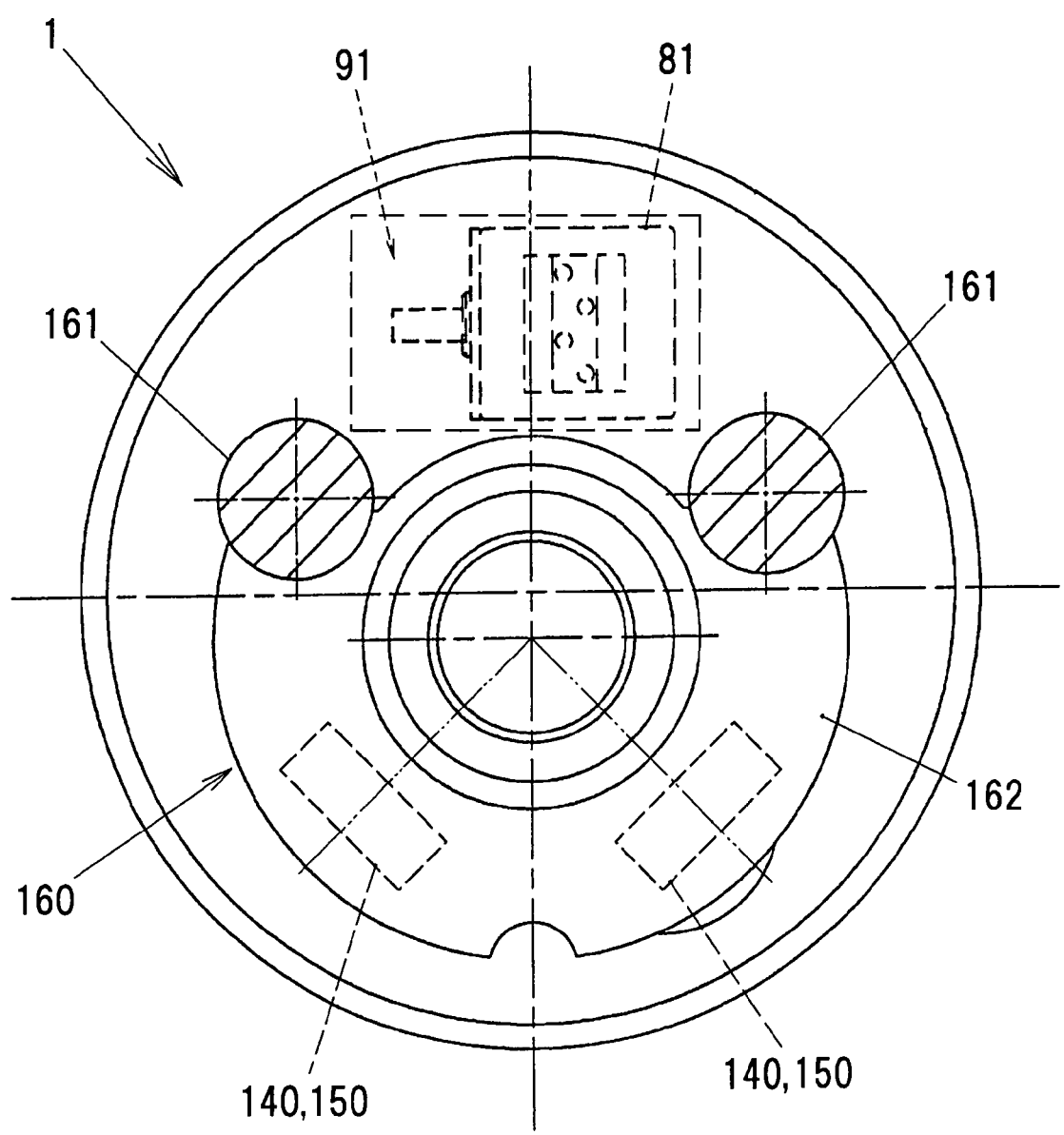
FIG. 4 is a cross sectional view taken along the line indicated with arrows IV-IV in FIG. 2.

The vibration reduction actuator 140 is a known voice coil motor (VCM) including a coil 141, a magnet 142, and a yoke 143. Referring to FIG. 4, in the normal shooting position of the camera 200, the pair of the coil 141, the magnet 142, and the yoke 143 are arranged below the optical axis A to be equiangularly separated by 90 degrees, for example, in the circumferential direction of the second-lens unit barrel 100.

The coil 141 is a plate-like coil or substrate coil provided to the second-lens unit chamber 110.

The magnet 142 and yoke 143 are provided to the cover 120, in which the magnet 142 is arranged opposite the coil 141. The coil 141 and magnet 142 are separated in the direction of the optical axis A so as not to obstruct movement of the second-lens unit chamber 110 in the plane orthogonal to the optical axis A.

When power is supplied from the camera 200 through a flexible printed circuit (FPC), not shown, etc. to flow a current through the coil 141, the vibration reduction actuator 140 drives the second-lens unit chamber 110 in the plane orthogonal to the optical axis A by an electromagnetic force produced between the coil 141 and the magnet 142.

The position detector 150 includes a Hall element 151, a magnet 152, and a yoke, not shown. The Hall element 151 is provided to the second-lens unit chamber 110 to be adjacent to the coil 141. The magnet 152 and yoke are provided to the second-lens unit barrel 100 to be opposite the Hall element 151. The Hall element 151 and magnet 152 are separated in the direction of the optical axis A in a similar manner to the coil 141 and magnet 142 of the vibration reduction actuator 140.

The position detector 150 serves to detect a position of the second-lens unit chamber 110 in the plane orthogonal to the optical axis A with respect to the second-lens unit barrel 100 (stationary barrel 20) in response to a variation in magnetic field between the Hall element 151 and the magnet 152. The configuration of the position detector 150 is not limited to the foregoing, and may be a known position-detector configuration having a combination of a light emitting diode (LED) and a photo sensing diode (PSD), for example.

The vibration reduction actuator 140 and the position detector 150 are arranged so that the positions in the direction of the optical axis A coincide with the position of the focus motor 81 in the accommodated state.

The shutter unit 160 is arranged on the projection side of the second lens unit L2.

The shutter unit 160 includes sectors or shutter screens, not shown, for adjusting exposure time and a pair of shutter motors 161 for driving a aperture for adjusting an amount of passing light. The shutter motors 161 are driven in accordance with operation of a shutter release switch, not shown, etc. provided to the camera 200, for example.

The shutter motors 161 are mounted to a shutter-unit base 162 supporting the sectors, the aperture, etc. with respect to the second-lens unit barrel 100. Referring to FIG. 3, in the normal shooting position of the camera 200, the shutter motors 161 are arranged in an area above the optical axis A to be axisymmetric with respect to a vertical line or axis of symmetry intersecting the optical axis A.

The shutter motors 161 are arranged to sandwich therebetween the focus-motor accommodation part 91 as viewed from the direction of the optical axis A, and are located so as not to coincide with an area through which the focus motor 81 passes when shifting the lens barrel 1 from the shooting state to the retracted state.

The shutter motors 161 are located so as not to coincide with the vibration reduction actuator 140 and the position detector 150 provided to the VR unit 90 as viewed from the direction of the optical axis A. Moreover, referring to FIG. 1, the shutter motors 161 are arranged so that part of the position in the direction of the optical axis A coincides with the position of the focus motor 81 in the retracted state.

Next, a description is given of the operation of the lens barrel 1 during shifting from the retracted state to the shooting state.

With the camera 200, when turning on a power switch, not shown, by a user such as a photographer, the output shaft 22 of the motor is rotated. With this, the intermediate barrel 30 is driven to the object side in the optical-axis direction by being guided by the cam groove of the stationary barrel 20.

When the intermediate barrel 30 is driven to the object side in the optical-axis direction, the cam barrel 40 is driven to the object side in the optical-axis direction by being guided by the cam groove of the intermediate barrel 30.

In accordance with movement of the cam barrel 40, the second-lens unit barrel 100 is also moved to the image side in the optical-axis direction. At that time, the second-lens unit barrel 100 is moved linearly in the direction of the optical axis A by being guided by the linear-drive key 36.

When the cam barrel 40 is driven to the object side in the optical-axis direction, the linear-drive barrel 60 and the first-lens unit chamber 70 are linearly moved to the object side in the optical-axis direction by being guided by the cam groove of the cam barrel 40 and the linear-drive guide barrel 50. In accordance with this, the lens barrier unit 61 is shifted from the closed state to the open state so that the camera 200 becomes in the shooting state.

When the user turns off the power switch in the shooting state, the output shaft 22 of the motor is rotated in the reverse direction so that the barrels are moved to the image side in the optical-axis direction contrary to the foregoing. At that time, referring to FIG. 1, the focus motor 81 is moved substantially parallel to the optical axis A, and is partly accommodated in the focus-motor accommodation part 91 provided to the VR unit 90. At that time, the first lens L1 and the second lens unit L2 are moved relatively along the direction of the optical axis A to be shifted to the accommodated state so that the barrels constituting the lens barrel 1 and the motor serve as a lens unit shifting part.

As described above, in this embodiment, the lens barrel 1 and camera 200 achieve an objective of the present invention; to provide a lens barrel with an vibration reduction unit, which allows a reduction in dimension of the lens barrel in the optical-axis direction in the accommodated state, and an imaging device including such lens barrel as follows. The shooting optical system is designed to have a two-group construction including first lens unit L1 serving as a focus lens and second lens unit L2 serving as an image-blur preventing lens. In the retracted state, the focus motor 81 arranged adjacent to the first lens unit L1 is accommodated in the focus-motor accommodation part 91 provided to the vibration reduction unit 90.

In this embodiment, the lens barrel 1 and camera 200 produce the following effects:

1) The focus-motor accommodation part 91 or a space is provided to the VR unit 90 (second-lens unit barrel 100, second-lens unit chamber 110, and cover 120). In the retracted state of the lens barrel 1, part of the focus motor 81 is accommodated in the focus-motor accommodation part 91 so that the positions of the focus motor 81 and VR unit 90 in the optical-axis direction coincide with each other. This allows a reduction in dimension of the lens barrel 1 in the optical-axis direction in the retracted state.

2) The typical focus motor is configured so that the dimension in the direction along the output shaft is greater than the radial dimension or diameter in order to enhance an output torque. On the other hand, in this embodiment, the lens barrel 1 is configured to have the output shaft of the focus motor 81 orthogonal to the optical axis A, thus allowing a reduction in dimension of the lens barrel 1 in the direction of the optical axis A.

3) The shutter motor 161 is arranged so as not to coincide with the focus-motor accommodation part 91 as viewed from the direction of the optical axis A. Moreover, the shutter motor 161 is arranged so that part of the position in the direction of the optical axis A coincides with the position of the focus motor 81 (focus-motor accommodation part 91) in the retracted state. This allows for an increase of the dimension in the depth-direction of the concaved portion 103 of the second-lens unit chamber 100. With this, the amount of coincidence of the focus motor 81 and VR unit 90 can be increased, resulting in closer arrangement of the first lens unit L1 and the second lens unit L2 in the accommodated state. This allows a further reduction in dimension of the lens barrel 1 in the direction of the optical axis A in the retracted state.

4) The vibration reduction actuator 140 and position detector 150 are arranged so as not to coincide with the focus-motor accommodation part 91 as viewed from the direction of the optical axis A. Moreover, the vibration reduction actuator 140 and position detector 150 are arranged so that the positions in the direction of the optical axis A coincide with the position of the focus motor 81 in the accommodated state. This allows for a reduction in dimension of the VR unit 90 (lens barrel 1) in the direction of the optical axis A.

5) The shooting optical system is designed to have a two-group construction. This allows a reduction in the thickness of the lens barrel 1 in the retracted state when compared, for example, with the lens barrel having a shooting optical system of three-group construction. This also allows a reduction in the total weight of the camera 200. Moreover, a reduction in manufacturing cost can be achieved from a reduction in the number of component parts.

VARIATIONS

It is understood that the present invention is not limited to the preferred embodiment described above, and various modifications and changes can be made without departing from the scope of the invention.

1) In the embodiment, the photographic optical system provided to the lens barrel and imaging device includes a zoom lens of two-group construction. Without being limited to the two-group construction, the shooting optical system may be; for example, of a three-group or four-group construction. The layout of the lens units can be modified as the occasion arises. By way of example, contrary to the embodiment, the first lens unit may serve as an vibration reduction optical system, and the second lens unit may serve to perform focusing.

2) In the embodiment, the output shaft of the drive part is arranged substantially parallel to the horizontal plane in the normal shooting position of the imaging device. Without being limited thereto, the direction of the output shaft of the drive part may be parallel, for example, to the radial direction of the first lens barrel.

3) In the embodiment, the axial direction of the output shaft of the drive part is orthogonal to the optical axis. Without being limited thereto, the axial direction of the output shaft of the drive part may be parallel to the optical axis. In this variation as well, with the condition that in the accommodated state of the lens barrel, at least part of the position of the second-lens unit support in the optical-axis direction coincides with the position of the drive part, a reduction can be achieved in dimension of the lens barrel in the direction of the optical axis in the accommodated state.

4) In the embodiment, the imaging device is a digital still camera. Without being limited thereto, the imaging device may be a film camera or a movie camera for recording moving images, for example.

What is claimed is:

1. A lens barrel comprising:
   a stationary part;
   a first lens unit arranged movably in a direction of an optical axis with respect to the stationary part;
   a second lens unit arranged with respect to the first lens unit along the direction of the optical axis;
   a drive part that drives the first lens unit in the direction of the optical axis with respect to the stationary part, the drive part moving with the first lens unit toward the second lens unit while the lens barrel is shifting to a retracted position; and a vibration reduction part that moves the second lens unit in a plane substantially orthogonal to the optical axis, wherein the vibration reduction part is configured to partially overlap with the drive part in the direction of the optical axis when the lens barrel is at the retracted position.

2. The lens barrel according to claim 1, further comprising:

a lens unit shifting part that moves the first lens unit and the second lens unit relatively in the direction of the optical axis so as to shift the first lens unit and the second lens unit to the retracted position.

3. The lens barrel according to claim 1, wherein the drive part includes a motor having an output shaft, wherein an axial direction of the output shaft is substantially orthogonal to the optical axis.

4. The lens barrel according to claim 3, further comprising:

a gear part that connects a torque about the output shaft provided by the motor to a torque about an axis substantially parallel with the optical axis.

5. The lens barrel according to claim 1, wherein the vibration reduction part is configured to have an accommodation part where the drive part is stored when the lens barrel is at the retracted position.

6. The lens barrel according to claim 5, wherein the accommodation part comprises a space having one of a cavity and a recess formed in the vibration reduction part.

7. The lens barrel according to claim 1, further comprising:

a shutter unit having a shutter-unit drive part, wherein at least a part of the shutter-unit drive part is configured to overlap with the drive part in the direction of the optical axis when the lens barrel is at the retracted position.

8. The lens barrel according to claim 7, wherein the shutter-unit drive part is arranged so as not to occupy an area through which the drive part passes in a plane substantially orthogonal to the direction of the optical axis while the lens barrel is being switched from a shooting position to the retracted position.

9. The lens barrel according to claim 7, wherein the vibration reduction part comprises a vibration reduction drive part for driving the second lens unit and a position detection part for detecting a position of the second lens unit with respect to the stationary part, wherein at least a part of the vibration reduction drive part and a part of the position detection part are configured to overlap in the direction of the optical axis with at least one of the drive part and the shutter-unit drive part when the lens barrel is at the retracted position.

10. The lens barrel according to claim 1, wherein the first lens unit is arranged on a side of an object in the direction of the optical axis in an optical system comprising the first lens unit and the second lens unit, wherein the first lens unit performs focusing by movement in the direction of the optical axis.

11. An imaging device comprising a lens barrel having:

a stationary part;

a first lens unit arranged movably in a direction of an optical axis with respect to the stationary part;

a second lens unit arranged with respect to the first lens unit along the direction of the optical axis;

a drive part that drives the first lens unit in the direction of the optical axis with respect to the stationary part, the drive part moving with the first lens unit toward the second lens unit while the lens barrel is shifting to a retracted position; and a vibration reduction part that moves the second lens unit in a plane substantially orthogonal to the optical axis, wherein the vibration reduction part is configured to partially overlap with the drive part in the direction of the optical axis when the lens barrel is at the retracted position.

* * * * *